Feb. 27, 1940.　　　　C. KNOBLOCH　　　　2,191,533
LIQUID VOLUME GAUGE
Filed April 5, 1937　　　　2 Sheets-Sheet 1
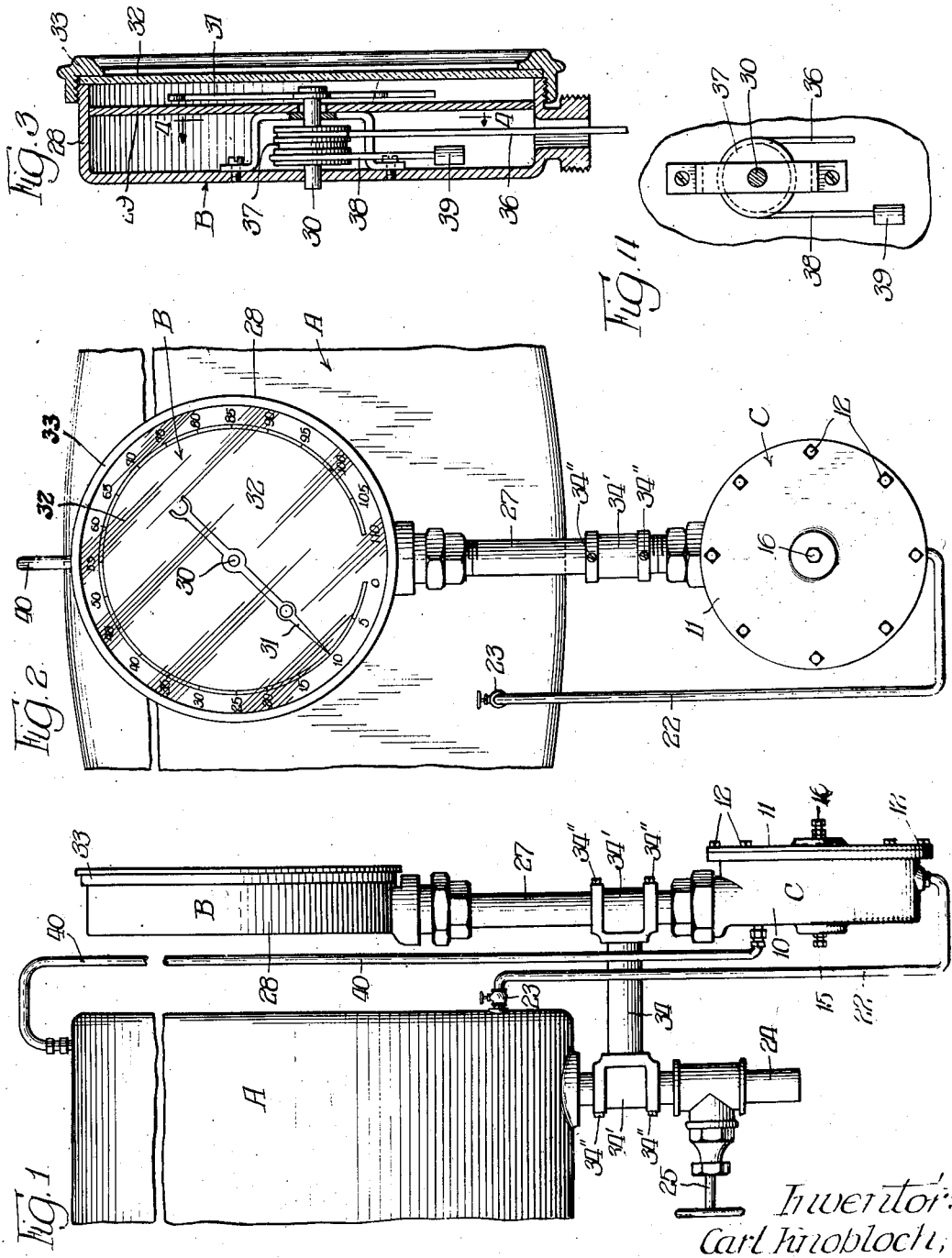

Feb. 27, 1940.  C. KNOBLOCH  2,191,533
LIQUID VOLUME GAUGE
Filed April 5, 1937  2 Sheets-Sheet 2
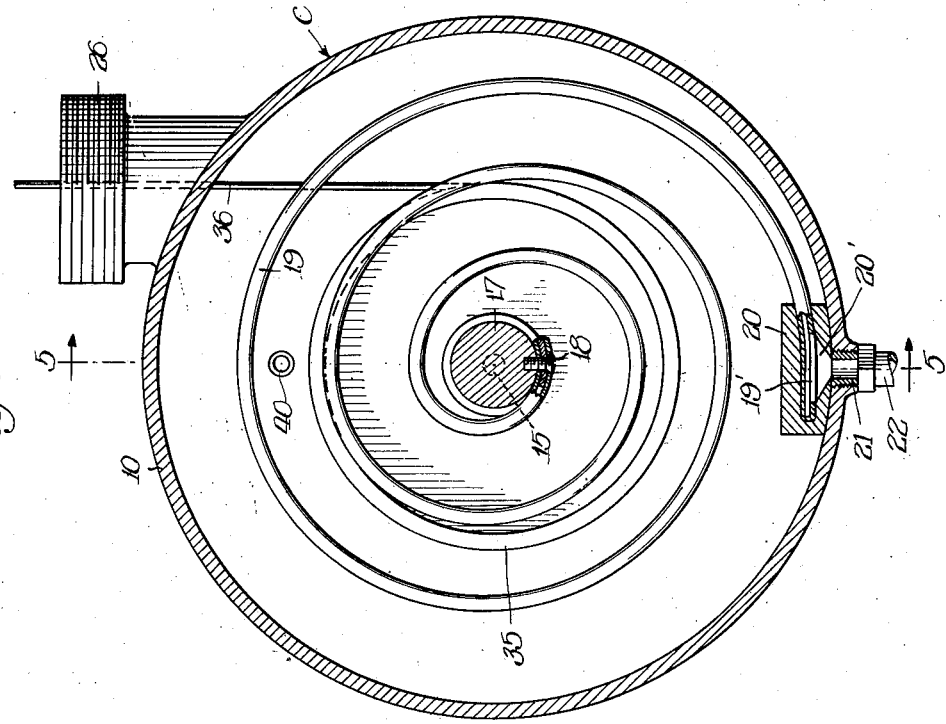
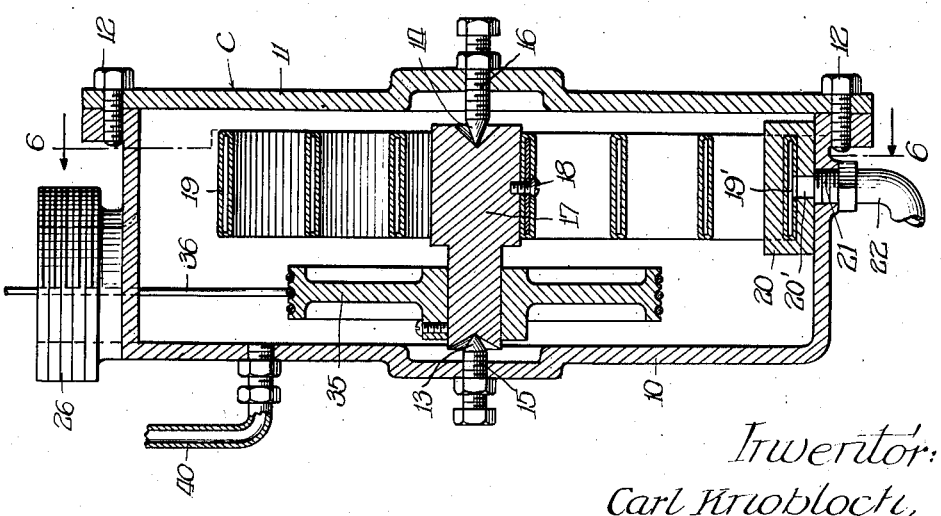
Inventor:
Carl Knobloch,
By Fisher, Clapp, Soans & Pond,
Attys.

Patented Feb. 27, 1940

2,191,533

UNITED STATES PATENT OFFICE 2,191,533

LIQUID VOLUME GAUGE

Carl Knobloch, Warren, Ohio

Application April 5, 1937, Serial No. 134,980

8 Claims. (Cl. 73—299)

This invention relates to that type of gauges which are designed for use in association with liquid containers, such, for examples, as gasoline, oil, and water tanks, to indicate the volume of liquid in the tank at all times. Such gauges are especially useful in bulk storage and filling stations to disclose the condition of storage tanks.

Numerous patents have heretofore been granted to me and to others on liquid volume gauges for these and similar purposes based on the principle of a diaphragm mounted on or in a tank containing the liquid and subjected on one side to the hydrostatic pressure of the liquid in the tank and on its opposite side to a uniform pressure, such as that of the atmosphere, a visual indicator, and a mechanical connection between the diaphragm and the indicator. These are generally known as "diaphragm" gauges; and, while their indications are in the main reliable and satisfactory, yet, owing to an unavoidable degree of inherent stiffness in the diaphragms, the large size required to get sufficient movement, and for other causes, they are not as sensitive and do not afford as perfect accuracy as is desirable. Furthermore, the manufacture of the diaphragms is a very delicate and expensive operation.

In Letters Patent No. 2,042,471, granted to me June 2, 1936, I have disclosed and claimed an improved liquid volume gauge which dispenses with the diaphragm as a motor for the indicator, and uses, in lieu thereof, one or more Bourdon tubes that are interiorly subjected directly to the hydrostatic pressure of liquid to be measured, and that, through their tendency to straighten or unwind when subjected to internal liquid pressure, impart movement to the pointer or other movable member of the indicator. I have found as the result of numerous practical tests that a gauge of the Bourdon tube type is more sensitive, accurate and reliable than gauges of the diaphragm type.

My present invention relates to the same general type of Bourdon tube gauge as the invention of my former patent above identified, but embodies certain improvements thereon which simplify the structure, lessen the cost of manufacture, decrease friction, and increase the sensitiveness and accuracy; these improvements consisting of reversing the end connections of the Bourdon tube, the elimination of the rotor 19 and the hollow stationary arbor 17 and its cap 18 of said patent, and the substitution of a solid rotatable arbor to which the inner closed end of the Bourdon tube is directly attached, the mounting of said solid arbor on anti-friction bearings at both ends thereof, the provision of a movement multiplying drive from said arbor to the indicator, and an improved mounting for the actuator and indicator by which both may be supported by and from the drain pipe of the tank; the attainment of such improvements constituting the main object of this invention.

One practical and workable embodiment of the present invention is illustrated in the accompanying drawings, although it is to be understood that the details of structure and arrangement therein shown may be widely varied without involving any departure from the operative principle or sacrificing any of the advantages secured thereby.

In the drawings—

Fig. 1 is a side elevation of the gauge shown applied to a liquid tank, the latter being shown fragmentarily and broken out between its top and bottom.

Fig. 2 is a front or face elevation of the same.

Fig. 3 is a vertical axial section through the indicator.

Fig. 4 is a detail view of a portion of the indicator, in section on the line 4—4 of Fig. 3.

Fig. 5 is a vertical axial section through the indicator actuator that is directly subjected to the hydrostatic pressure of the liquid in the tank, taken on the line 5—5 of Fig. 6.

Fig. 6 is a vertical transverse section of the same taken on the line 6—6 of Fig. 5.

In the drawings, A designates as an entirety a liquid container, such as a gasoline or oil tank, B designates as an entirety an indicator, herein shown as of the dial type, and C designates as an entirety an indicator actuator that is subjected to and operated by the hydraulic pressure of the liquid in the container A.

First describing the indicator actuator C, shown in detail in Figs. 5 and 6, 10 designates the body member of a casing, the open side of which may be closed by a lid or cover 11 attached thereto by suitable machine screws 12. Rotatably mounted within this casing on and between a pair of point bearings 13 and 14 formed on the inner ends of screws 15 and 16 respectively mounted in the body 10 and cover 11 of the casing, is an arbor 17. To the arbor 17 is attached, as by a screw 18 (Figs. 5 and 6), the inner plugged end of a spiral Bourdon tube 19 preferably of the flat type shown. The outer end of the tube 19 is mounted in a block 20 that in turn is secured to the inner side of the peripheral wall of the casing body member 10, and communicates through a slot 19' in the outer wall of the tube, a passage 20' in the bottom of block 20, and a coupling 21 screwed into the peripheral wall of the casing body beneath block 20, with a tube 22 that, as shown in Fig. 1, is connected into a petcock 23 that, in turn, is screwed into an end wall of the tank A slightly above the bottom of the latter. Connected into the bottom of the tank is a drain pipe 24 equipped with a shut off valve 25, which is occasionally opened to draw off sediment that settles in the bottom of the tank.

The body 10 of the casing is formed on its upper end with a threaded hollow boss 26, to which is suitably connected a tube 27 (Figs. 1 and 2) that, in turn, is connected into the lower end of a dial casing 28, forming the body member of the indicator B. This dial indicator may be of ordinary construction, including a dial plate 29 calibrated in gallons or other indicia, an arbor 30, a pointer 31 overlying the dial plate 29, a crystal 32, and a clamping ring 33. In the arrangement shown the members B and C, and the tube 27 are supported from the pipe 24 by a bracket 34 formed on its ends with sleeves 34' that embrace pipe 24 and tube 27 and are locked thereto by set screws 34". However, the indicator B and actuator C may be independently supported within the purview of the invention.

Referring to Fig. 5, fixed to the arbor 17 of the indicator actuator as by a set screw is a grooved pulley 35, to which is attached a cord 36 that extends upwardly through the tube 27 and at its upper end is attached to a grooved pulley 37 (Fig. 3) fast on the arbor 30 of the indicator. The driven pulley 37 is preferably considerably smaller in diameter than the driving pulley 35, so that the rotary movement of the arbor 17 is multiplied in transmission to the arbor 30 of the indicator pointer. Also attached to the pulley 37 and depending from the opposite side thereof from the cord 36 is a cord 38 supporting a weight 39. The pulley 35 is of much larger diameter relatively to the diameter of the Bourdon tube coil 19 than the corresponding pulley 32 of my aforesaid patent, being, as shown, approximately two-thirds the diameter of the coil, so that the shorter arcuate movements of the inner end of the coil 19 transmit substantially the same swing to the indicator pointer 31 as do the longer arcuate movements of the outer end of the coil 21 in the device of my aforesaid patent.

The operation of the gauge is probably obvious from the foregoing description of its structure, but may be briefly described as follows.

When the tank A is filled with liquid, the latter flows down through the pipe 22 into and filling the Bourdon tube 19, which latter, as above stated, is plugged or closed at its inner end that is attached to the arbor 17. The hydrostatic pressure tends to unwind or straighten the Bourdon tube, under the well understood principle of the latter, and this imparts a limited turning movement to the arbor 17, which, in the arrangement shown in Fig. 6, is in a clockwise direction. This movement is transmitted through the pulley 35, cord 36, pulley 37 and arbor 30 to the pointer 31, moving the latter to a point on the scale showing the number of gallons in the tank A. As the liquid in the tank is drawn off, the hydrostatic pressure of course decreases, and the Bourdon tube, tending to resume its normal position, turns the shaft 17 backwardly or in a counter-clockwise direction viewing Fig. 6, and the weight 39 acting through its cord 38 on the pulley 37, tends to both return the pointer toward zero position, and also maintains a sufficient tension on the cord 36 to keep the latter taut. Of course, a spring might be used in place of weight 39.

The Bourdon tube (a plurality of which may be employed if desired, as disclosed in my former patent above identified) may be made of any metal of an elastic or springy character, such as sulphur bronze, tempered brass or copper, or thin steel, so that, under the influence of internal pressure it tends to unwind or straighten, and, when the pressure is relieved or reduced, it tends to return to normal position.

The Bourdon tube is very sensitive to slight variations in internal pressure, being, in fact, much more sensitive than the bellows diaphragms heretofore quite generally used in gauges of this type, and hence affords more accurate and reliable scale readings. The point bearings 13 and 14 of the arbor 17 also contribute very materially to the sensitiveness and accuracy of the gauge.

This improved gauge has the advantage that it automatically takes care of variations in the height of gasoline in the tank due to expansion and contraction under variations in temperature, the scale having been calibrated empirically by test with the liquid at say 60° F. Variations in the volume caused by expansion when the temperature rises above that point, or contraction when the temperature falls below that point, do not affect the hydrostatic pressure existing in the Bourdon tube, because an increase in the volume of the liquid due to a rising temperature is accompanied by a decrease in specific gravity, and vice versa, so that the hydrostatic pressure in the tube remains constant and consequently the dial needle remains stationary under temperature changes.

Hence, the reading obtained by the indicator is indicative of the volume of fluid at 60° F. and not the actual volume within the tank unless the temperature happens to be at 60° F.

With the tank partially filled with gasoline, vapors are constantly being generated, which, accumulating in the closed top of the tank, create some pressure on the surface of the liquid, which is in addition to the hydrostatic pressure; and to prevent a slightly inaccurate reading of the indicator due to this cause, I connect the top of the tank with the interior of the actuator casing by an open pipe connection 40 (Figs. 1 and 5), which equalizes the gas pressure at all times existing in the tank and in the casing of the actuator which contains the Bourdon tube, so that the differential internal pressures on the outer and inner sides of the Bourdon tubes remain constant; any slight changes of internal pressure due to variations in vapor pressure on the liquid in the tank being neutralized by correspondingly increased or decreased external gas pressures acting on the outer surfaces of the tube. This last described feature, however, forms in part the subject matter of my aforesaid patent above identified, and no claim of novelty thereto is made herein.

If desired, a plurality of Bourdon tubes may be used after the manner shown in my former Patent No. 2,042,471.

I claim:

1. In a liquid volume gauge of the type described responsive to and operated by the hydrostatic head of a body of liquid, the combination of a rotatable arbor, anti-friction bearings for the ends of said arbor, a spiral Bourdon tube formed with an inner closed end directly fastened to said arbor, means for fixedly supporting the outer end of said Bourdon tube, a pipe communicating with the outer end of said Bourdon tube, said pipe leading from a tank containing said body of liquid and said tank located at such a height as to produce a gravity flow of liquid through said pipe into said Bourbon tube, a liquid volume indicator, and means for transmitting rotary movement of said arbor to said indicator.

2. In a liquid volume gauge of the type described responsive to and operated by the hydrostatic head of a body of liquid, the combination of a rotatable arbor mounted at its ends on axially alined point bearings, a spiral Bourdon tube formed with an inner closed end directly fastened to said arbor, means for fixedly supporting the outer end of said Bourdon tube, a pipe communicating with the outer end of said Bourdon tube, said pipe leading from the lower portion of a tank containing said body of liquid and said tank located at such a height as to produce a gravity flow of liquid through said pipe into said Bourdon tube, a liquid volume indicator, and means for transmitting rotary movement of said arbor to said indicator.

3. In a liquid volume gauge of the type described, the combination of a fixed casing having a peripheral wall, a rotatable arbor mounted in and co-axial with said casing, a spiral Bourdon tube encircling said arbor and formed with an inner closed end directly attached to the periphery of said arbor and with an outer closed end attached to said peripheral wall, a pipe communicating through the peripheral wall of said casing with the outer end of said Bourdon tube, said pipe leading from the lower portion of an elevated tank containing a body of liquid, a liquid volume indicator having a pointer shaft, and movement multiplying operating connections between said arbor and said shaft.

4. In a liquid volume gauge of the type described, the combination of a fixed casing, opposed pointed bearing members mounted in opposite walls of said casing, an arbor lying between and at its ends journaled on said bearing members, a spiral Bourdon tube encircling said arbor and formed with an inner closed end directly attached thereto and with an outer closed end attached to said casing, a pipe communicating through a wall of said casing with the outer end of said Bourdon tube, said pipe leading from an elevated tank containing a body of liquid, a liquid volume indicator, and operating connections between said arbor and said indicator.

5. In a liquid volume gauge of the type described, the combination of a fixed casing, opposed pointed bearing members adjustably mounted in opposite walls of said casing, an arbor lying between and at its ends journaled on said bearing members, a pulley fast on said arbor, a spiral Bourdon tube encircling said arbor and formed with an inner closed end directly attached thereto and with an outer closed end attached to said casing, a pipe communicating through a wall of said casing with the outer end of said Bourdon tube, said pipe leading from an elevated tank containing a body of liquid, a liquid volume indicator, and a cord operating connection between said pulley and said indicator.

6. The combination with a tank, of means for indicating the volume of a liquid in said tank, comprising a fixed casing located below said tank, opposed adjustable bearing members mounted in opposite walls of said casing, an arbor lying between and at its ends journaled on said bearing members, a pulley fast on said arbor, a tubular member mounted on said casing, a spiral Bourdon tube encircling said arbor and formed with an inner closed end directly attached thereto and with an outer closed end attached to said casing, a pipe leading from the lower portion of said tank to said casing and communicating with the outer end of said Bourdon tube, a liquid volume indicator mounted on said tubular member, and a cord-operating connection extending from said pulley through said tubular member to said indicator.

7. The combination with a tank, and a drain pipe depending from the bottom of said tank, of means for indicating the volume of a liquid in said tank, comprising a fixed casing and means for supporting the same from said drain pipe in a position below said tank, opposed adjustable anti-friction bearing members mounted in opposite walls of said casing, an arbor lying between and at its ends journaled on said bearing members, a pulley fast on said arbor, an upright tubular member mounted on said casing, the axis of said tubular member being substantially tangential to said pulley, a spiral Bourdon tube encircling said arbor and formed with an inner closed end directly attached to the periphery of said arbor and with an outer closed end attached to said casing, a pipe leading from the lower portion of said tank and communicating through a wall of said casing with the outer end of said Bourdon tube, a liquid volume indicator mounted on the upper end of said tubular member, and a cord operating connection extending from said pulley through said tubular member to said indicator.

8. The combination with a tank, and a drain pipe depending from the bottom of said tank, of means for indicating the volume of a liquid in said tank, comprising a bracket attached to and extending laterally of said drain pipe, an upright tubular member attached to and supported by said bracket, a casing attached to and depending from the lower end of said tubular member and having a peripheral wall, a liquid volume indicator mounted on the upper end of said tubular member, opposed adjustable anti-friction bearing members mounted in opposite walls of said casing, an arbor lying between and at its ends journaled on said bearing members, a pulley fast on said arbor and of a diameter such that the axis of said tubular member is substantially tangential thereto, a spiral Bourdon tube encircling said arbor and formed with an inner closed end directly attached to the periphery of said arbor and with an outer closed end attached to the peripheral wall of said casing, a pipe leading from the lower portion of said tank and communicating through said peripheral wall with the outer end of said Bourdon tube, and a cord operating connection extending from said pulley through said tubular member to said indicator.

CARL KNOBLOCH.